(12) United States Patent
Hatada

(10) Patent No.: US 12,034,891 B2
(45) Date of Patent: Jul. 9, 2024

(54) MEDIATION SERVER MEDIATING BETWEEN TERMINAL DEVICE AND COMMUNICATION DEVICE

(71) Applicant: BROTHER KOGYO KABUSHIKI KAISHA, Nagoya (JP)

(72) Inventor: Kumi Hatada, Tokai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/062,781

(22) Filed: Dec. 7, 2022

(65) Prior Publication Data
US 2023/0208986 A1  Jun. 29, 2023

(30) Foreign Application Priority Data
Dec. 27, 2021  (JP) ................. 2021-213225

(51) Int. Cl.
*H04N 1/00* (2006.01)
*H04N 1/44* (2006.01)

(52) U.S. Cl.
CPC ..... *H04N 1/00344* (2013.01); *H04N 1/00079* (2013.01); *H04N 1/00244* (2013.01); *H04N 1/4413* (2013.01); *H04N 1/4426* (2013.01); *H04N 1/4433* (2013.01); *H04N 2201/0094* (2013.01)

(58) Field of Classification Search
CPC ........... H04N 1/00344; H04N 1/00079; H04N 1/00244; H04N 1/4413; H04N 1/4426; H04N 1/4433; H04N 2201/0094
See application file for complete search history.

(56) References Cited

U.S. PATENT DOCUMENTS

| | | | |
|---|---|---|---|
| 2014/0071476 A1 | 3/2014 | Aritomi | |
| 2021/0216251 A1* | 7/2021 | Suzuki | G06F 3/1203 |
| 2021/0289104 A1* | 9/2021 | Deguchi | H04N 1/4433 |
| 2021/0303238 A1* | 9/2021 | Minamiyama | G06F 3/1203 |
| 2021/0306430 A1* | 9/2021 | Tsuji | H04L 67/51 |
| 2021/0306510 A1* | 9/2021 | Okuno | H04N 1/32064 |

FOREIGN PATENT DOCUMENTS

JP  2014-56320 A  3/2014

* cited by examiner

*Primary Examiner* — Juan M Guillermety
(74) *Attorney, Agent, or Firm* — Scully, Scott, Murphy & Presser, P.C.

(57) ABSTRACT

A mediation server mediating between a terminal device and a communication device may be configured to: receive a permission request from a user terminal, the permission request is for requesting permission for the user terminal to communicate with the communication device via the mediation server; specify the communication information in a memory by using specifying information included in the permission request; send a receipt notification to an administration terminal by using the communication information; in a case where the administration terminal that has received the receipt notification from the mediation server accepts a predetermined operation, store authentication information to the memory; and in a case where the authentication information is stored in the memory in association with the device identification information, send a first storage notification to the user terminal.

11 Claims, 11 Drawing Sheets

(Registration Process for Administrator (Continuation of FIG. 3))

(Registration Process for User (Continuation of FIG. 6))

(Process of Application for Use (Continuation of FIG. 8))

(Second Embodiment: Process of Application for Use)

(Third Embodiment: Registration Process for User (Continuation of FIGS. 3 to 5))

MEDIATION SERVER MEDIATING BETWEEN TERMINAL DEVICE AND COMMUNICATION DEVICE

REFERENCE TO RELATED APPLICATIONS

This application claims priority to Japanese Patent Application No. 2021-213225 filed on Dec. 27, 2021. The entire content of the priority application is incorporated herein by reference.

BACKGROUND ART

A print system using a printer via a server is known. An administrator performs a printer sharing setting by using a screen of the server. The administrator inputs user information to the screen and inputs a sharing instruction. In this way, a user indicated by the user information as well as the administrator can use the printer via the server.

DESCRIPTION

According to the technology above, the user needs to inform the administrator of the user information. If the user does not know who the administrator is, the printer sharing setting is not performed and thus the user cannot use the printer via the server. The disclosure herein provides a technology that allows a user to receive permission for using communication between a communication device and a user terminal via a mediation server from an administrator even when the user does not know who the administrator is.

A mediation server mediating between a terminal device and a communication device is disclosed herein. The mediation server may comprise: a communication interface configured to communicate with the terminal device and the communication device; a memory configured to store communication information for mediating between an administration terminal and the communication device, wherein the administration terminal is a terminal device that an administrator of the communication device uses, and the communication information includes device identification information for identifying the communication device; and a controller, wherein the controller is configured to: receive a permission request from a user terminal via the communication interface, wherein the user terminal is a terminal device that a user different from the administrator uses, the permission request is for requesting permission for the user terminal to communicate with the communication device via the mediation server, and the permission request includes specifying information for specifying the communication information stored in the memory; in a case where the permission request is received from the user terminal, specify the communication information in the memory by using the specifying information included in the permission request; send a receipt notification to the administration terminal via the communication interface by using the communication information specified by using the specifying information, the receipt notification indicating that the permission request has been received from the user terminal; in a case where the administration terminal that has received the receipt notification from the mediation server accepts a predetermined operation, store authentication information in the memory in association with the device identification information, the predetermined operation indicating that the administrator permits the user terminal to communicate with the communication device via the mediation server; and in a case where the authentication information is stored in the memory in association with the device identification information, send a first storage notification to the user terminal via the communication interface, the first storage notification indicating that the authentication information has been stored in the memory in association with the device identification information.

According to this configuration, in response to receiving the permission request from the user terminal, the mediation server sends the administration terminal the receipt notification indicating that the permission request has been received from the user terminal. The administrator operates the administration terminal that received the receipt notification. In response to this operation, the mediation server stores the authentication information in the memory in association with the device identification information. That is, the user can receive permission from the administrator simply by operating the user terminal even when the user does not know who the administrator is.

A control method for implementing the mediation server above, a computer program for implementing the mediation server above, and a non-transitory computer-readable recording medium storing the computer program are also novel and useful. Further, a communication system including the mediation server, communication device, and terminal device above is also novel and useful.

FIRST EMBODIMENT

Figure 1:
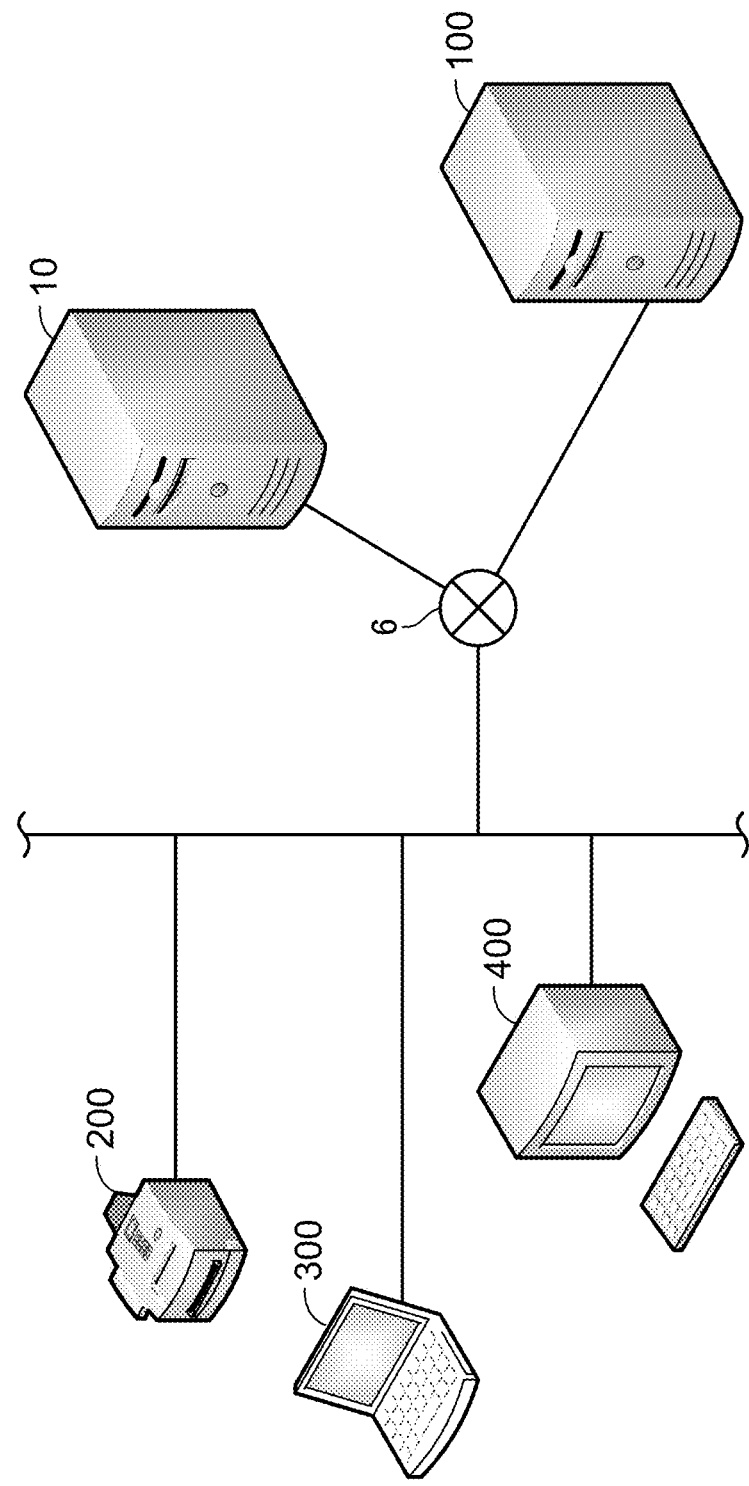
FIG. 1 illustrates a configuration of a communication system.

Configuration of Communication System 2; FIG. 1

As illustrated in FIG. 1, a communication system 2 comprises a service server (termed "SP server" hereinafter) 10, a management server 100, a multifunctional device (termed "MFP" hereinafter) 200, a user terminal 300, and an administration terminal 400. The MFP 200 is a device having multi functions, including a print function, a scan function, etc. The user terminal 300 and the administration terminal 400 are terminal devices such as a notebook PC, a laptop PC, a tablet terminal, and a smartphone. The administration terminal 400 is a terminal that an administrator of the MFP 200 uses. The user terminal 300 is a terminal that a user different from the administrator uses.

The MFP 200, the user terminal 300, and the administration terminal 400 are connected to a LAN (local area network) 4. The devices 200, 300, and 400 are communicable with other devices (e.g., the MFP 200) on the LAN 4 via the LAN 4. The LAN 4 is wired or wireless.

The SP server 10 and the management server 100 are connected to the internet 6. The devices 10 and 100 are communicable with other devices (e.g., the SP server 10) on the internet 6 via the internet 6. The SP server 10 and the management server 100 are set up, for example, by the vendor of the MFP. One of the SP server 10 and the management server 100 may be set up by a business entity different from the vendor of the MFP.

The LAN 4 is connected to the internet 6. Devices on the LAN 4 (e.g., the user terminal 300) are communicable with devices on the internet 6 (e.g., the SP server 10) via the LAN 4 and the internet 6.

Figure 2:
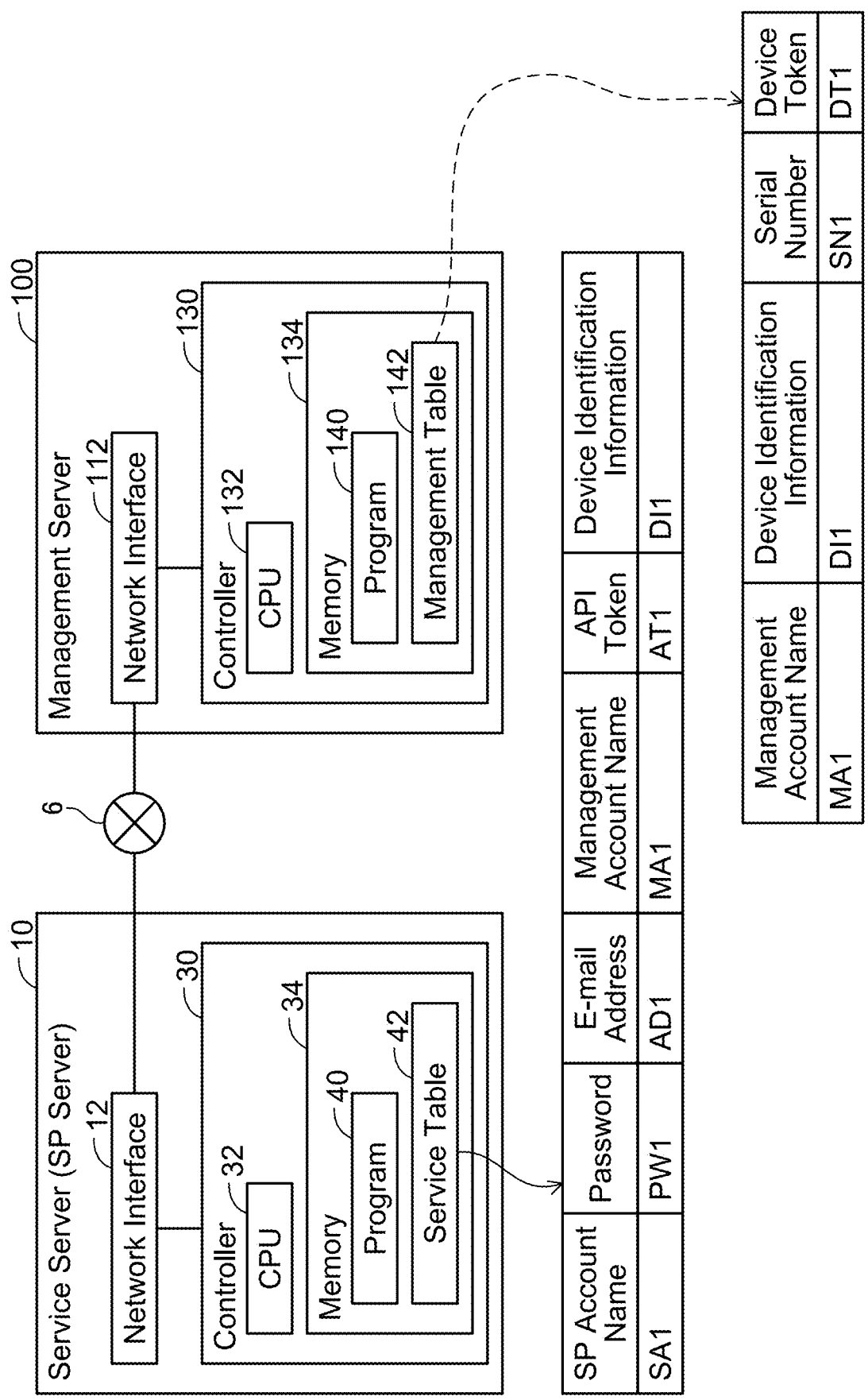
FIG. 2 illustrates a block diagram of a service server and a management server.

Configuration of SP Server 10; FIG. 2

The SP server 10 provides various MFP-related services such as a remote function service of remotely controlling the MFP 200 via the internet 6, etc. The SP server 10 comprises a network interface 12 and a controller 30. The units 12, 30 are connected to a bus line (reference sign omitted). Hereinafter, an interface will be abbreviated as "I/F". The network OF 12 is an OF for communication via the internet 6 and is connected to the internet 6.

The controller 30 comprises a CPU 32 and a memory 34. The CPU 32 executes various processes in accordance with a program 40 stored in the memory 34. The memory 34 is configured of a volatile memory, a non-volatile memory, etc. The memory 34 stores a service table 42 in addition to the program 40.

The service table 42 stores information used for the SP server 10 to provide the remote function service. The service table 42 stores, for each of a plurality of users, an SP account name, a password, an e-mail address, a management account name, an API (application programming interface) token, and device identification information. The SP account name and the management account name indicate an account of the administrator or an account of the user. The SP account name is managed by the SP server 10, while the management account name is managed by the management server 100. The management account name is created by the management server 100. The device identification information is information for identifying an MFP that can use the remote function and is created by the management server 100. The API token is information for authorizing communication with a terminal device (e.g., the management terminal 400).

Configuration of Management Server 100; FIG. 2

The management server 100 manages communication with MFPs that can use the remote function. The management server 100 comprises a network OF 112 and a controller 130. The units 112, 130 are connected to a bus line (reference sign omitted). The network OF 112 is connected to the internet 6.

The controller 130 comprises a CPU 132 and a memory 134. The CPU 132 executes various processes in accordance with a program 140 stored in the memory 134. The memory 134 stores a management table 142 in addition to the program 140.

The management table 142 stores MFP-related information. The management table 142 stores, for each of a plurality of accounts, a management account name, device identification information, a serial number, and a device token. The serial number is an identification number assigned to each MFP during manufacture. The device token is information for authorizing communication with an MFP (e.g., 200).

Figure 3:
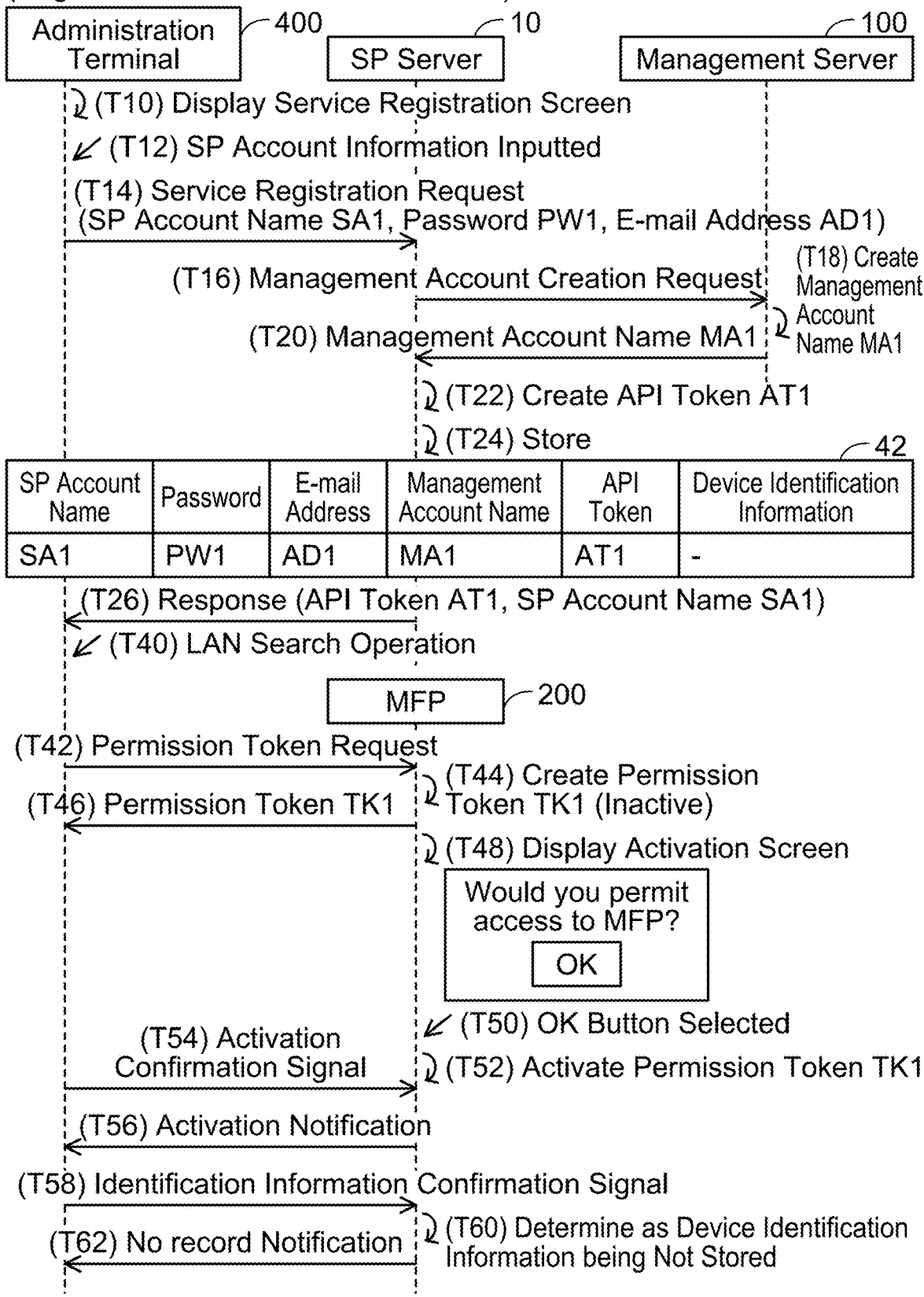
FIG. 3 illustrates a sequence diagram of a registration process for an administrator.
Figure 4:
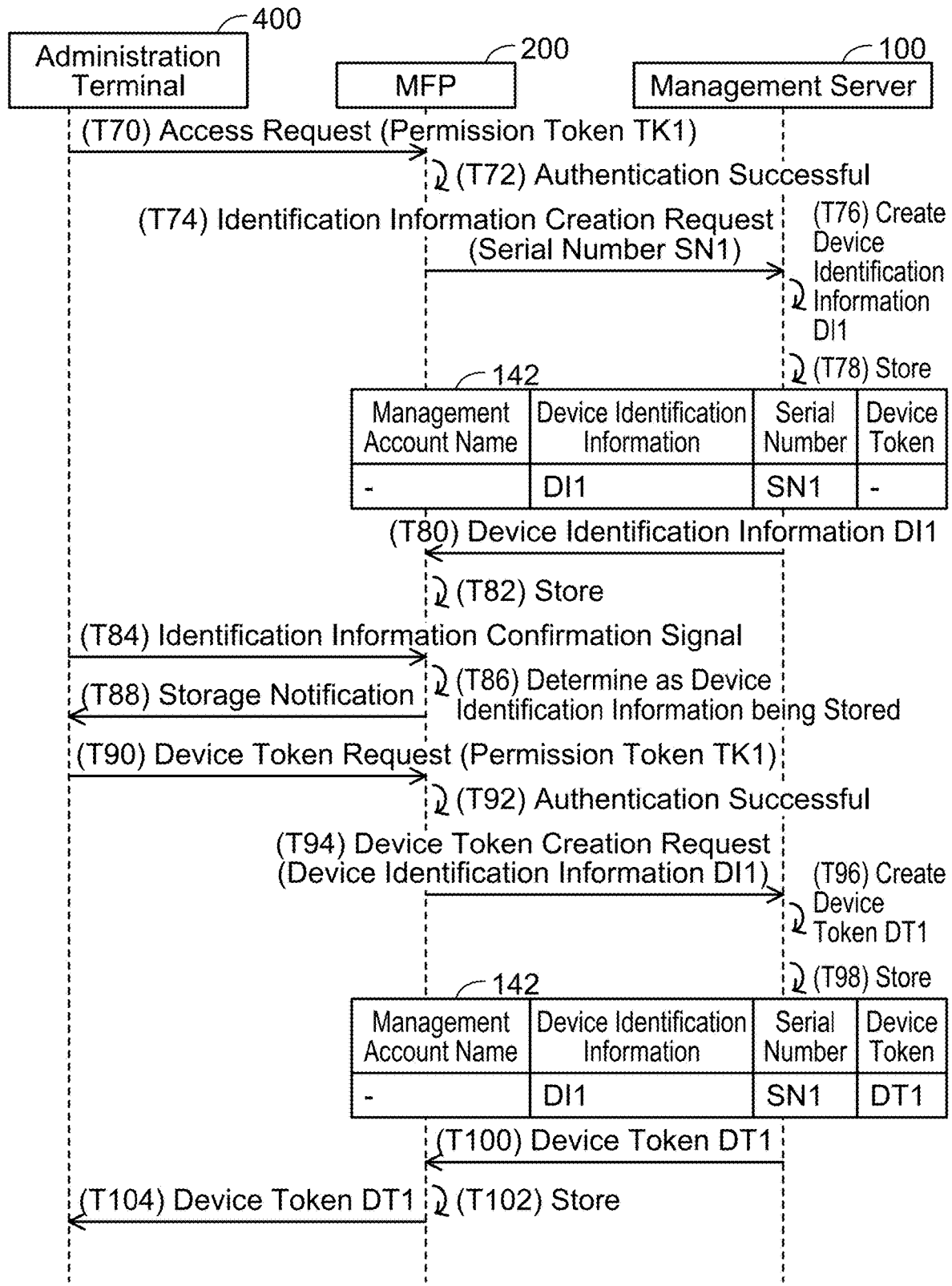
FIG. 4 illustrates a sequence diagram continued from FIG. 3.
Figure 5:
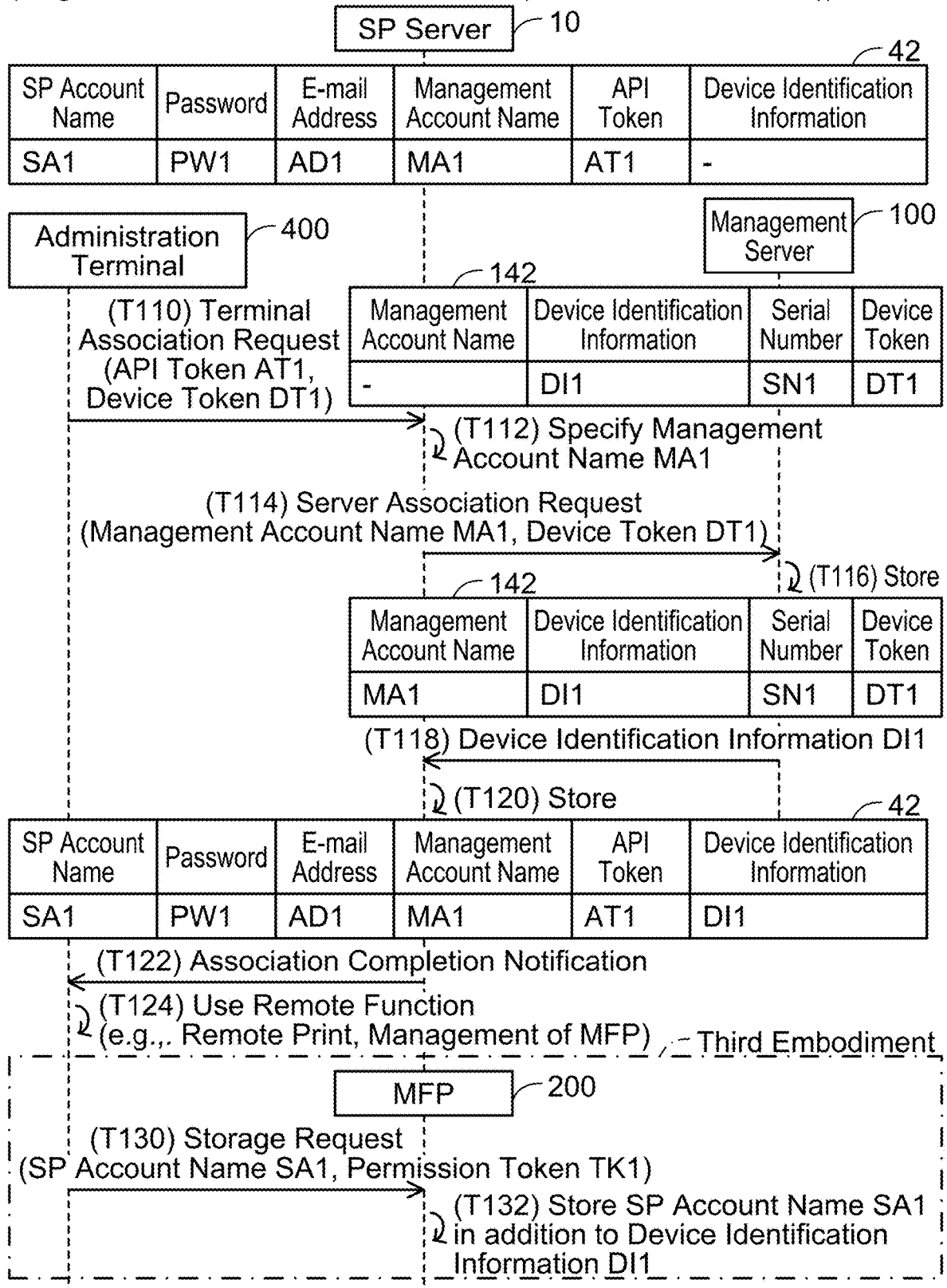
FIG. 5 illustrates a sequence diagram continued from FIG. 4.

Registration Process for Administrator; FIGS. 3, 4, 5

Referring to FIGS. 3 to 5, a registration process to register information related to the administrator will be described. By performing this registration process, the administrator is allowed to use the remote function. Hereinafter, in order to facilitate understanding, steps executed by the CPUs of devices (e.g., the CPU 32 of the SP server 10, etc.) in accordance with the programs (e.g., the program 40, etc.) will be described with the devices (e.g., the SP server 10, etc.) as subjects of action, not with the CPUs as subjects of action. Further, in the following description, the devices 10, 100, 200, 300, 400 communicate with other devices via at least one of the internet 6 and the LAN 4. Thus, hereinafter, phrases "via the internet 6" and "via the LAN 4" will be omitted unless necessary. Further, the devices 10, 100 communicate with other devices via the corresponding network I/Fs 12, 112. Thus, hereinafter, a phrase "via the network I/F 12 (or the network I/F 112)" will be omitted unless necessary.

In T10, the administration terminal 400 accepts an operation from the administrator and displays a service registration screen. The service registration screen is a screen for registering information used to receive provision of the remote function service to the SP server 10. The service registration screen includes an input field for input of various information. The service registration screen corresponds to screen data that the administration terminal 400 received from the SP server 10, and it is displayed, for example, by a browser program of the administration terminal 400.

In T12, the administrator inputs SP account information related to an account of the administrator to the service registration screen at the administration terminal 400. The SP account information includes an SP account name SA1, a password PW1, and an e-mail address AD1. The e-mail address AD1 is an e-mail address available to the administrator. The e-mail address AD1 is set, for example, in an e-mailer of the administration terminal 400.

When accepting the input of the SP account information from the administrator in T12, the administration terminal 400 sends the SP server 10 a service registration request that requests registration of information used to receive provision of the remote function service to the SP server 10 in T14. The service registration request includes the SP account information inputted in T12.

When receiving the service registration request from the administration terminal 400 in T14, the SP server 10 sends the management server 100 a management account creation request that requests creation of a management account name in T16. The management server 100 thus creates a management account name MA1 in T18 and sends the management account name MA1 to the SP server 10 in T20.

When receiving the management account name MA1 from the management server 100 in T20, the SP server 10 creates an API token AT1 in T22. In T24, the SP server 10 then stores the SP account information included in the service registration request of T14, the management account name MA1 of T20, and the API token AT1 of T22 in the service table 42.

In T26, the SP server 10 sends the administration terminal 400 a response to the service registration request of T14. This response includes the API token AT1 and the SP account name SA1.

When receiving the response from the SP server 10 in T26, the administration terminal 400 stores the API token AT1 included in the response in association with the SP account name SA1.

In T40, the administrator performs a LAN search operation to the administration terminal 400. The LAN search operation is an operation to search for one or more MFPs connected to the LAN 4. In the present case, the MFP 200 connected to the LAN 4 is found.

After executing the search according to the operation of T40, the administration terminal 400 sends the MFP 200 found in T40 a permission token request that requests a permission token in T42. The permission token is information for authentication of a signal from a terminal device (e.g., the administration terminal 400).

When receiving the permission token request from the administration terminal 400 in T42, the MFP 200 creates a permission token TK1 in T44 and sends the permission token TK1 to the administration terminal 400 in T46. At this point of time, the MFP 200 is in an inactive state in which the permission token TK1 is inactive. In the inactive state, even when receiving a signal including the permission token TK1 from the administration terminal 400, the MFP 200 does not execute authentication using the permission token TK1 nor send a response to the signal.

In T48, the MFP 200 displays an activation screen that inquires whether to activate the permission token TK1. In the present case, the administrator approaches the MFP 200 and selects an OK button in the activation screen in T50.

When the OK button is selected in T50, the MFP 200 changes the state of the MFP 200 from the inactive state to an active state in T52. In the active state, when receiving a signal including the permission token TK1 from the administration terminal 400, the MFP 200 executes authentication using the permission token TK1 and sends a response to the signal.

After receiving the permission token TK1 in T46, the administration terminal 400 regularly sends an activation confirmation signal to the MFP 200. The activation confirmation signal is a signal to confirm that the state of the MFP 200 is the active state. In the present case, the administration terminal 400 sends the activation confirmation signal to the MFP 200 in T54 followed by T52 in which the state of the MFP 200 is changed to the active state. In T56, the administration terminal 400 receives, from the MFP 200, an activation notification indicating that the state of the MFP 200 is the active state as a response to the activation confirmation signal.

In T58, the administration terminal 400 sends an identification information confirmation signal to the MFP 200. The identification information confirmation signal is a signal to confirm whether the MFP 200 has already stored device identification information or not.

When receiving the identification information confirmation signal from the administration terminal 400 in T58, the MFP 200 determines whether it has already stored device identification information or not in T60. In the present case, the MFP 200 has not stored device identification information yet because registration of the administrator is not completed yet at this point of time (i.e., the MFP 200 has not been used yet for the remote function service). The MFP 200 thus determines that it has not stored device identification information and sends the administration terminal 400 a no record notification indicating that device identification information has not been stored yet in T62. Thus, the administration terminal 400 executes processes of FIG. 4 onward according to the receipt of the no record notification.

In T70 of FIG. 4, the administration terminal 400 sends the MFP 200 an access request that requests access to the management server 100 to the MFP 200. The access request includes the permission token TK1.

When receiving the access request from the administration terminal 400 in T70, the MFP 200 executes authentication of the permission token TK1 included in the access request in T72. In the present case, the authentication in T72 succeeds. In T74, the MFP 200 then sends the management server 100 an identification information creation request that requests creation of device identification information. The identification information creation request includes a serial number SN1 of the MFP 200.

When receiving the identification information creation request from the MFP 200 in T74, the management server 100 creates device identification information DI1 in T76. In T78, the management server 100 stores the serial number SN1 included in the identification information creation request in the management table 142 in association with the created device identification information DI1. Then, in T80, the management server 100 sends the created device identification information DI1 to the MFP 200.

When receiving the device identification information DI1 from the management server 100 in T80, the MFP 200 stores the device identification information DI1 in T82.

After sending the access request, the administration terminal 400 regularly sends the identification information confirmation signal to the MFP 200. In the present case, the administration terminal 400 sends the identification information confirmation signal to the MFP 200 in T84 followed by T82 in which the MFP 200 stores the device identification information DI1. Thus, the MFP 200 determines in T86 that it has already stored the device identification information DI1, and in T88, it sends the administration terminal 400 a storage notification indicating that the device identification information has been stored.

When receiving the storage notification from the MFP 200 in T88, the administration terminal 400 sends the MFP 200 a device token request that requests a device token in T90. The device token request includes the permission token TK1. T92 is the same as T72 except that the permission token TK1 in the device token request is used.

In response to the success of authentication of T92, the MFP 200 sends the management server 100 a device token creation request that requests creation of a device token in T94. The device token creation request includes the device identification information DI1.

When receiving the device token creation request from the MFP 200 in T94, the management server 100 creates a device token DT1 in T96. In T98, the management server 100 stores the created device token DT1 in the management table 142 in association with the device identification information DI1 included in the device token creation request. Then, the management server 100 sends the created device token DT1 to the MFP 200 in T100.

When receiving the device token DT1 from the management server 100 in T100, the MFP 200 stores the device token DT1 in T102. This allows the MFP 200 to communicate with the management server 100 using the device token DT1. For example, the MFP 200 establishes an XMPP (Extensible Messaging and Presence Protocol) connection with the management server 100 using the device token DT1. The XMPP connection is a so-called constant connection and maintained until the MFP 200 is turned off. By using the XMPP connection, the management server 100 can send requests to the MFP 200 beyond a firewall of the LAN 4 to which the MFP 200 belongs, without receiving requests from the MFP 200. The management server 100 may send requests to the MFP 200 not by the XMPP connection but by another method. For example, an HTTPS (Hypertext Transfer Protocol Secure) connection may be established between the management server 100 and the MFP 200. In T104, the MFP 200 sends the device token DT1 to the administration terminal 400. In a modification, a token different from the device token DT1 may be used in the XMPP connection. For example, the management server 100 may store a different token in the management table 142 in association with the device identification information DI1 when creating the device identification information DI1 and send the different token to the MFP 200. The MFP 200 may establish the XMPP connection with the management server 100 using the different token received from the management server 100. In this modification, the device token DT1 is sent to the administration terminal 400, while the different token is not sent to the administration terminal 400. The different token is kept secret from the administration terminal 400.

When receiving the device token DT1 from the MFP 200 in T104, the administration terminal 400 sends the SP server 10 a terminal association request that requests the SP account name SA1 of the administrator be associated with the device identification information DI1 of the MFP 200 in T110 of FIG. 5. The terminal association request includes the API token AT1 received in T26 of FIG. 3 and the device token DT1 received in T104 of FIG. 4.

When receiving the terminal association request from the administration terminal 400 in T110, the SP server 10 specifies, in the service table 42, the management account name MA1 stored in association with the API token AT1 included in the terminal association request in T112.

In T114, the SP server 10 sends the management server 100 a server association request that requests the SP account name SA1 of the administrator be associated with the device identification information DI1 of the MFP 200. The server association request includes the management account name MA1 specified in T112 and the device token DT1 included in the terminal association request of T110.

When receiving the server association request from the SP server 10 in T114, the management server 100 stores the management account name MA1 included in the server association request in the management table 142 in association with the device token DT1 included in the server association request in T116. Then, the management server 100 sends the SP server 10 the device identification information DI1 stored in the management table 142 in association with the management account name MA1 in T118.

When receiving the device identification information DI1 from the management server 100 in T118, the SP server 10 stores, in T120, the device identification information DI1 in the service table 42 in association with the management account name MA1 specified in T112. Thus, the SP account name SA1 of the administrator is associated with the device identification information DI1 of the MFP 200 using the management account name MA1 stored in both the service table 42 and the management table 142.

In T122, the SP server 10 sends the administration terminal 400 an association completion notification indicating that the association of the SP account name SA1 of the administrator with the device identification information DI1 of the MFP 200 has been completed.

When receiving the association completion notification from the SP server 10 in T122, the administration terminal 400 executes a process to use the remote function in T124. Here, the remote function includes a plurality of functions including: remote printing in which a print request is sent to the MFP 200 via the internet 6; remote scanning in which a scan request is sent to the MFP 200 via the internet 6; and remote setting in which a setting change request is sent to the MFP 200 via the internet 6. For example, for the remote printing, the administration terminal 400 sends a print request including the API token AT1 to the SP server 10 in response to an instruction from the administrator. When authentication of the API token AT1 included in the print request succeeds, the SP server 10 specifies, in the service table 42, the management account name MA1 stored in association with the API token AT1 and forwards the print request, along with the management account name MA1, to the management server 100. The management server 100 specifies, in the management table 142, the device identification information DI1 stored in association with the management account name MA1 and sends the print request to the MFP 200 using the XMPP connection with the MFP 200 identified by the device identification information DI1. In this way, the MFP 200 receives the print request from the administration terminal 400 via the internet 6 and executes printing according to the print request. For the remote scanning, through communication same as above, a scan request is sent to the MFP 200 via the internet 6 and a scanned image is sent from the MFP 200 to the administration terminal 400 via the internet 6. For the remote setting, through communication same as above, a setting change request is sent to the MFP 200 via the internet 6 and setting(s) (e.g., print setting, scan setting, etc.) of the MFP 200 is thus changed. In the present embodiment, the administrator is entitled to use all of the remote function.

Figure 6:
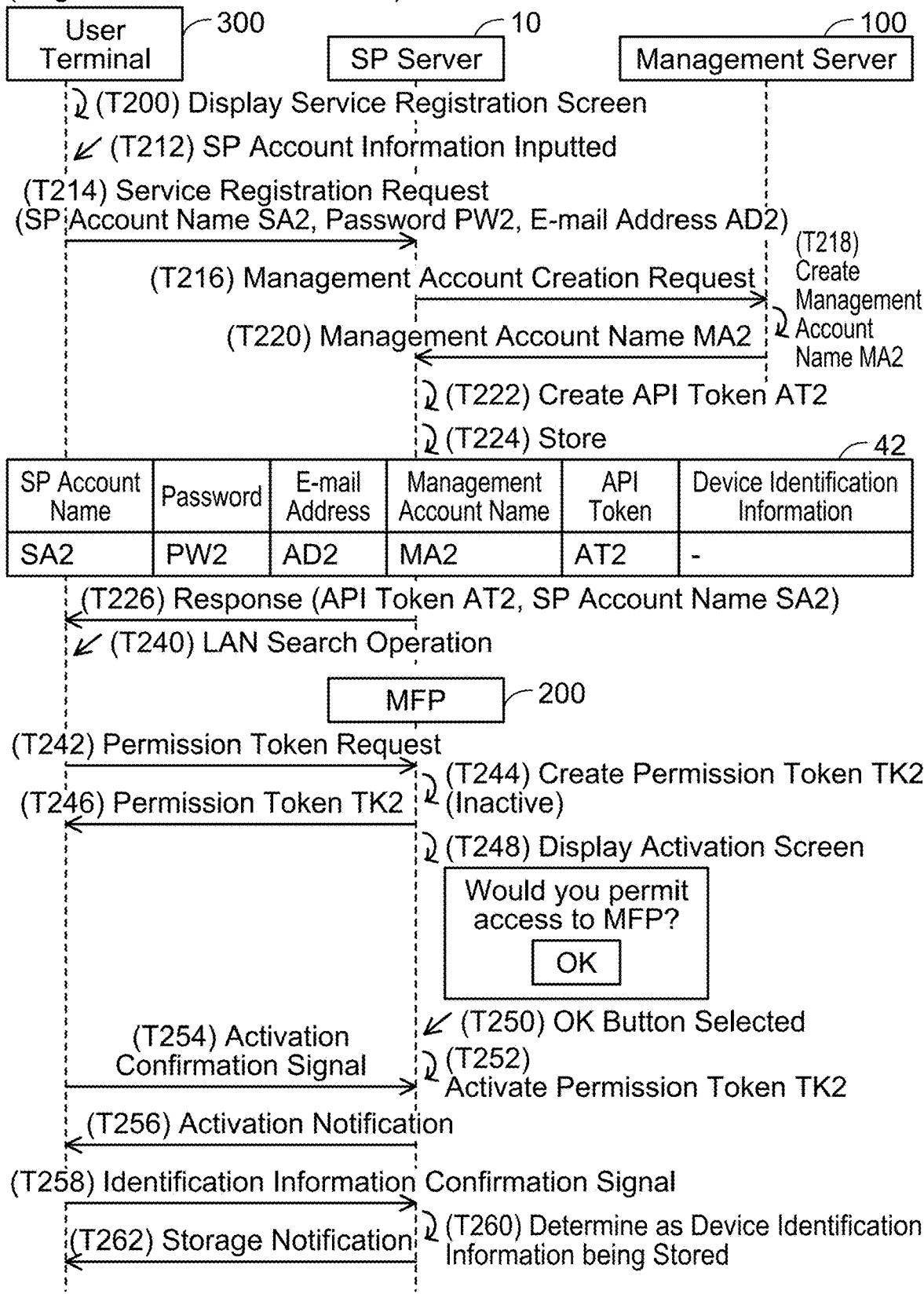
FIG. 6 illustrates a sequence diagram of a registration process for a user.
Figure 7:
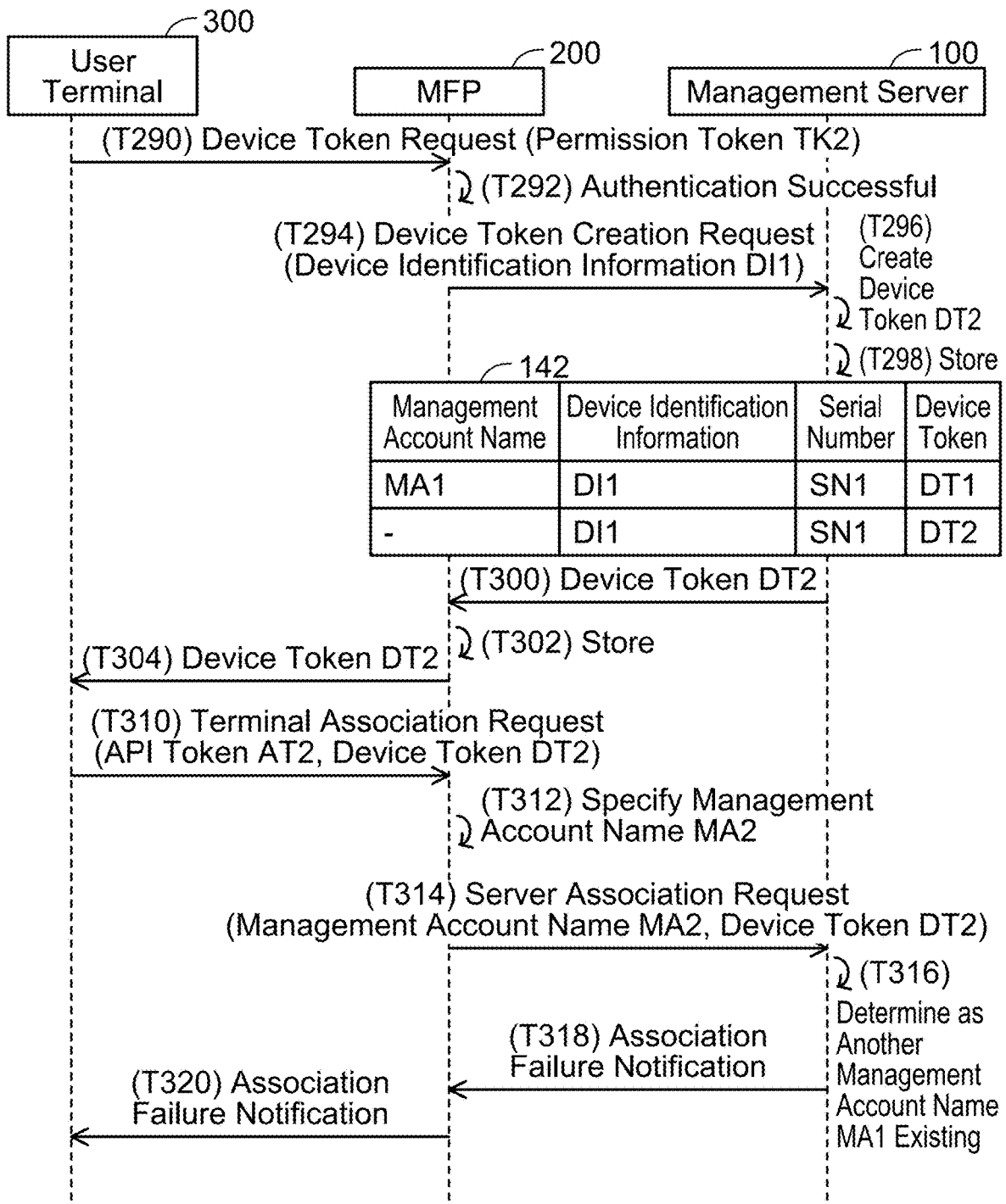
FIG. 7 illustrates a sequence diagram continued from FIG. 6.

Registration Process for User; FIGS. 6, 7

Referring to FIGS. 6 and 7, a registration process to register information related to the user will be described. Here, the user is a person who is not in charge of managing the MFP 200. In the present embodiment, the user wishes to use the remote function service for the MFP 200 and attempts to perform a registration process similar to the one illustrated in FIGS. 3 to 5.

In the process of FIG. 6, the user terminal 300 is used instead of the administration terminal 400. A sequence from T200 to T226 is the same as the sequence from T10 to T26 of FIG. 3 except that SP account information (i.e., an SP account name SA2, a password PW2, an e-mail address AD2) of the user is used, a management account name MA2 is created, and an API token AT2 is created. The e-mail address AD2 is an e-mail address available to the user. The e-mail address AD2 is set, for example, in a mailer of the user terminal 300.

A sequence from T240 to T258 is the same as the sequence from T40 to T58 in FIG. 3 except that a permission token TK2 is created. In the present case, the MFP 200 has already stored the device identification information DI1 (see T82 in FIG. 4) due to the registration process for the administrator in FIGS. 3 to 5 having been completed. The MFP 200 thus determines that it has already stored the device identification information DI1 in T260 and sends a storage notification to the user terminal 300 in T262. As a result, the user terminal 300 proceeds to the process of FIG. 7 without sending an access request to the MFP 200.

A sequence from T290 to T304 in FIG. 7 is the same as the sequence from T90 to T104 in FIG. 4 except that a device token DT2 different from the device token DT1 in T96 of FIG. 4 is created. In the present case, in addition to the device token DT1, the device token DT2 is stored in the management table 142 in association with the device identification information DI1.

A sequence from T310 to T314 is the same as the sequence from T110 to T114 in FIG. 4 except that the API token AT2, the device token DT2, and the management account name MA2 are used. The management server 100 attempts to store the management account name MA2 received in T314. However, in the present embodiment, each of the servers 10, 100 is designed incapable of storing two or more management account names in association with one piece of device identification information. That is, there is only one person as the administrator of the MFP 200 which can receive the remote function. In the present case, the management account name MA1 of the administrator is already stored in the management table 142 in association with the device identification information DI1. Thus, the management server 100 determines in T316 that the other management account name MA1 is already in the management table 142. The management server 100 then sends the MFP 200 an association failure notification indicating that association of the SP account name SA2 of the user with the device identification information DI1 of the MFP 200 failed in T318, without storing the management account name MA2 in the management table 142. In T320, the MFP 200 forwards the association failure notification received from the management server 100 to the user terminal 300.

Figure 8:
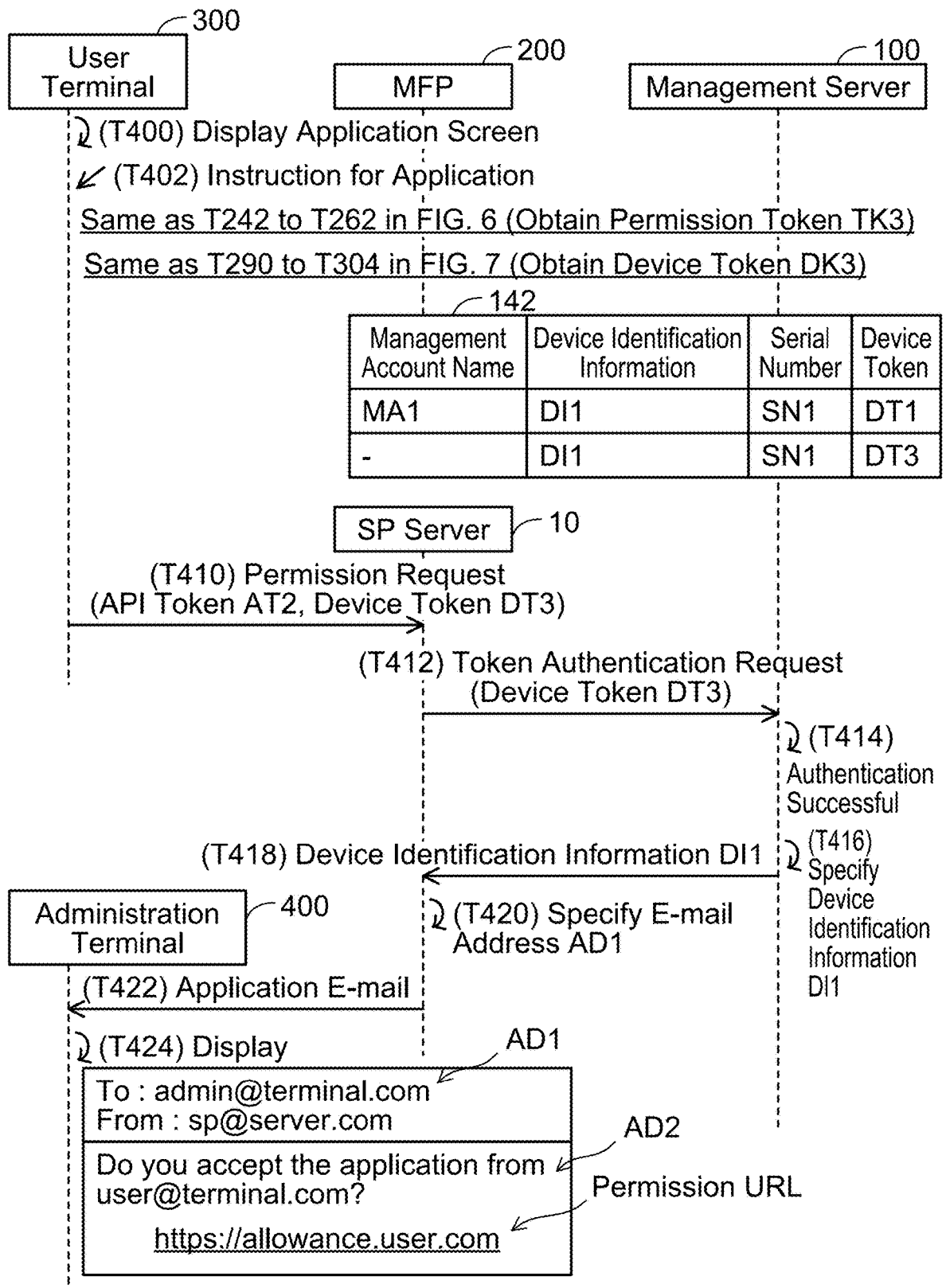
FIG. 8 illustrates a sequence diagram of an application process.

The user terminal 300 executes processes of FIG. 8 onward with the receipt of the association failure notification from the MFP 200 in T320 as a trigger.

Figure 9:
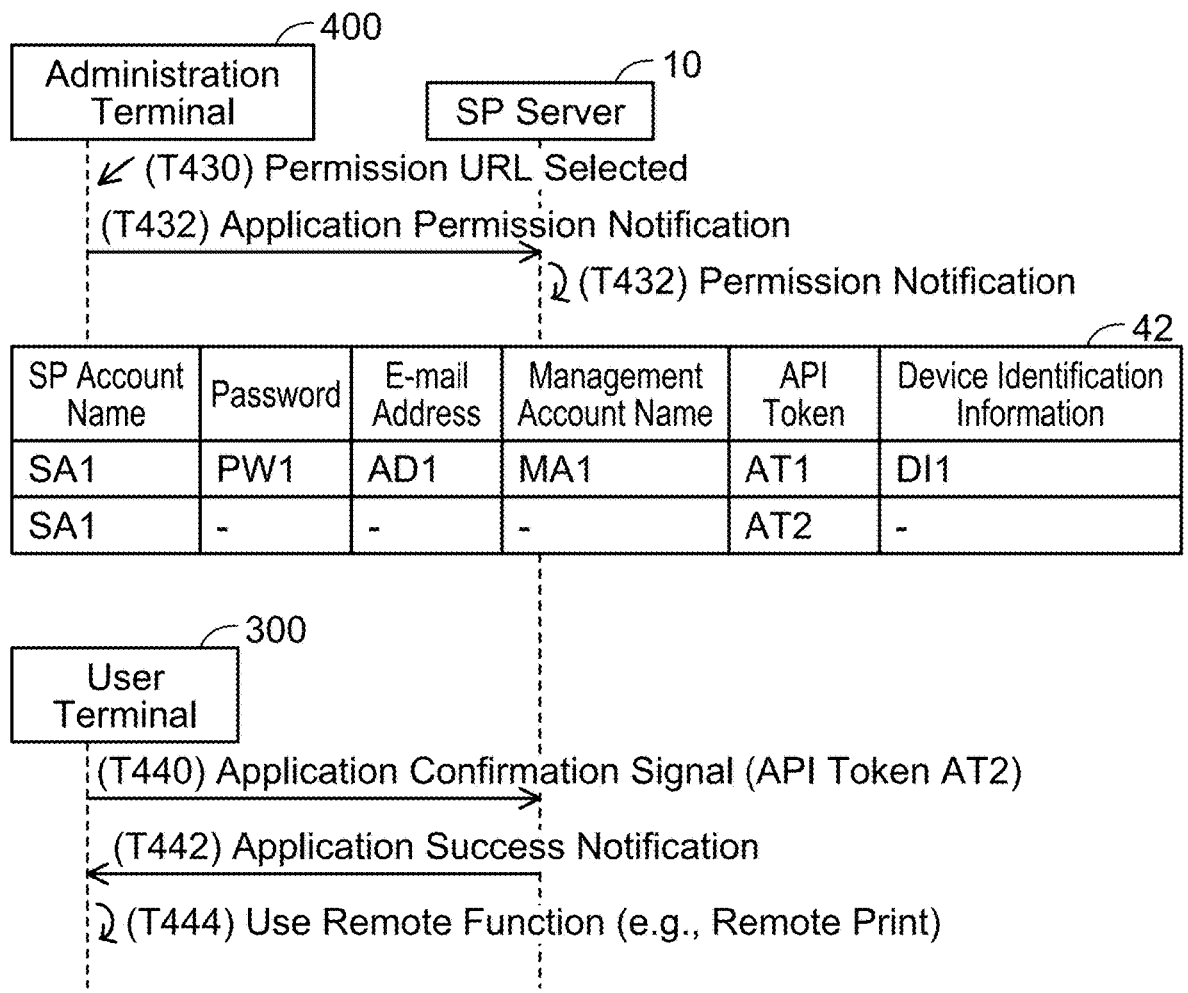
FIG. 9 illustrates a sequence diagram continued from FIG. 8.

Application Process; FIGS. 8, 9

Referring to FIGS. 8 and 9, a process for the user to apply for use of the remote function to the administrator will be described. In T400, the user terminal 300 displays an application screen for accepting an instruction to apply for use of the remote function. The user sees the application screen displayed at the user terminal 300 and inputs an instruction for application to the user terminal 300 in T402.

In the present embodiment, a sequence similar to the sequence from T242 to T262 in FIG. 6 is executed with the instruction for application of T402 as a trigger, and as a result the user terminal 300 obtains a permission token TK3 from the MFP 200. Further, a sequence similar to the sequence from T290 to T304 in FIG. 7 is executed using the permission token TK3, and as a result the user terminal 300 obtains a device token DT3 from the MFP 200. Furthermore, in addition to the device token DT1, the device token DT3 is stored in the management table 142 of the management server 100 in association with the device identification information DI1.

With the receipt of the device token DT3 from the MFP 200 (see T304 in FIG. 7) as a trigger, the user terminal 300 sends the SP server 10 a permission request that requests permission for the user to use the remote function in T410. The permission request includes the API token AT2 received in T226 of FIG. 6 and the device token DT3.

When receiving the permission request from the user terminal 300 in T410, the SP server 10 sends the management server 100 a token authentication request that requests authentication of a device token in T412. The token authentication request includes the device token DT3 included in the permission request.

When receiving the token authentication request from the SP server 10 in T412, the management server 100 executes authentication of the device token included in the token authentication request. Specifically, the management server 100 determines whether the device token included in the token authentication request matches any of the device tokens stored in the management table 142. In the present case, the device token DT3 included in the token authentication request matches the device token DT3 stored in the management table 142. Thus, the management server 100 determines in T414 that the authentication of the device token DT3 included in the token authentication request succeeds and executes steps from T416 onward. If the authentication of the device token included in the token authentication request fails, the steps from T416 onward are skipped and the process of FIG. 8 is terminated.

In T416, the management server 100 specifies, in the management table 142, the device identification information DI1 stored in association with the device token DT3. In T418, the management server 100 sends the specified device identification information DI1 to the SP server 10.

When receiving the device identification information DI1 from the management server 100 in T418, then in T420, the SP server 10 specifies, in the service table 42, the e-mail address AD1 of the administrator stored in association with the device identification information DI1 (see T120 in FIG. 5).

In T422, the SP server 10 creates an application e-mail to apply for user's use of the remote function to the administrator. The destination of the application e-mail includes the e-mail address AD1 of the administrator specified in T420. Further, the body of the application e-mail includes the e-mail address AD2 of the user received in T214 of FIG. 6. Since the body of the application e-mail includes the e-mail address AD2 of the user, the administrator can recognize who applied for use of the remote function by reading the application e-mail.

The body of the application e-mail further includes a permission URL. The permission URL is an URL for accepting an instruction for the administrator to permit the user to use the remote function.

In T422, the SP server 10 further executes a process to send the application e-mail. As a result, the administration terminal 400 receives the application e-mail from the SP server 10 in T422 and displays the application e-mail in T424.

In T430 of FIG. 9, the administrator selects the permission URL in the application e-mail. As a result, the administration terminal 400 sends the SP server 10 a permission notification indicating that the administrator permits the user to use the remote function in T432.

When receiving the permission notification from the administration terminal 400 in T432, the SP server 10 activates the API token AT2 created in T222 of FIG. 6 in T434. Specifically, the SP server 10 changes a state in which the API token AT2 is stored in association with only the SP account name SA2 of the user (see T224 in FIG. 6) to a state in which the API token AT2 is stored in association with not only the SP account name SA2 of the user but also with the SP account name SA1 of the administrator. That is, in the state before the activation, the device identification information DI1 cannot be specified by using the API token AT2, while in the state after the activation, the device identification information DI1 can be specified by using the API token AT2. Thus, in addition to the API token AT1 of the administrator, the API token AT2 of the user is stored in association with the device identification information DI1.

After sending the permission request in T410 of FIG. 8, the user terminal 300 regularly sends the SP server 10 an application confirmation signal to confirm whether the application according to the permission request succeeds. The application confirmation signal includes the API token AT2.

When receiving the application confirmation signal from the user terminal 300 in T440, the SP server 10 determines whether the API token AT2 included in the application confirmation signal is active or not. In the present case, the API token AT2 is activated in T434. Thus, in T442, the SP server 10 sends the user terminal 300 an application success notification indicating that the application has succeeded.

When receiving the application success notification from the SP server 10 in T442, the user terminal 300 executes a process to use the remote function in T444. In the present embodiment, the user is not entitled to use a part of the remote function. Specifically, the user can use the remote printing and the remote scanning but cannot use the remote setting. In a modification, the user may be entitled to use all of the remote function.

Effects of Present Embodiment

According to the configuration of the present embodiment, when receiving the permission request from the user terminal 300 (T410 in FIG. 8), the SP server 10 sends the application e-mail to the administration terminal 400 (T422). The administrator selects the permission URL in the application e-mail (T430 in FIG. 9). As a result, the SP server 10 stores the API token AT2 in the service table 42 in association with the device identification information DI1 and activates the API token AT2 (T434). The user is permitted to use the remote function by the API token AT2 being activated. That is, the user can receive the permission from the administrator simply by operating the user terminal 300 even when the user does not know who the administrator is.

Further, for example, it can be contemplated that the user attempts to register himself/herself as an administrator without knowing that the administrator has been already registered. According to the configuration of the present embodiment, the application process (FIGS. 8 and 9) is executed with the user terminal 300 receiving the association failure notification from the MFP 200 as a trigger (T320 in FIG. 7). Even when the user fails to register himself/herself as an administrator, the user can apply for use of the remote function.

Further, according to the configuration of the present embodiment, the device token DT3 is created by the management server 100 with the selection of the OK button in the activation screen displayed at the MFP 200 as a trigger and sent to the user terminal 300 (T250 in FIGS. 6 and T296, T304 in FIG. 7 referred in FIG. 8). That is, in order for the user terminal 300 to obtain the device token DT3, the user needs to operate the MFP 200. In a comparative example in which the user terminal 300 can obtain the device token DT3 without the selection of the OK button in the activation screen, a third party that cannot operate the MFP 200 may obtain the device token DT3 illicitly. The present embodiment can suppress the device token DT3 from being illicitly obtained by such third party. In a modification, the configuration of the comparative example above may be employed.

Correspondence Relationships

The SP server 10 and the management server 100 are an example of "mediation server". The network I/F 12 and the network I/F 112 are an example of "communication interface". The memory 34 and the memory 134 are an example of "memory". The MFP 200 is an example of "communication device". The user terminal 300 and the administration terminal 400 are examples of "user terminal" and "administration terminal", respectively. The various information stored in association with the SP account name SA1 of the administrator in the service table 42 and the management table 142 are examples of "communication information". The device identification information DI1 is an example of "device identification information". The device token DT3 is an example of "specifying information". The application e-mail is an example of "receipt notification". The selection of the permission URL is an example of "predetermined operation". The API token AT2 of the user is an example of "authentication information". The application success notification of T442 in FIG. 9 is an example of "first storage notification". The device token creation request of T294 in FIG. 7 is an example of "predetermined request". The management account name MA1 and the management account name MA2 are examples of "administrator information" and "user information", respectively. The selection of the OK button in T250 of FIG. 6 referred in FIG. 8 is an example of "specific operation". The e-mail address AD2 of the user is an example of "user identification information".

T410, T420, and T422 in FIG. 8 are examples of "receive a permission request", "specify the communication information", and "send a receipt notification", respectively. T434 and T442 in FIG. 9 are examples of "store authentication information" and "send a first storage notification", respectively.

SECOND EMBODIMENT

Figure 10:
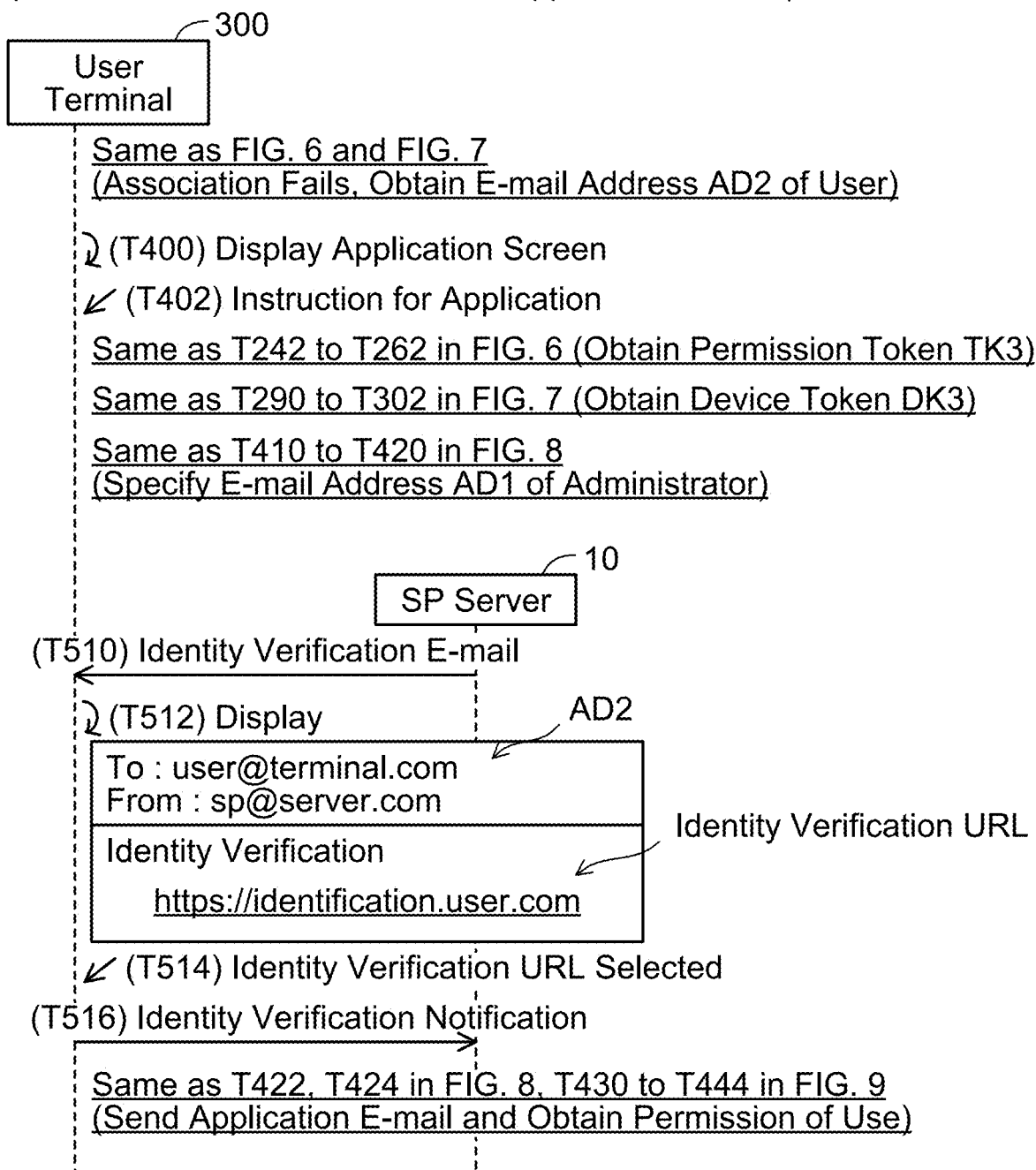
FIG. 10 illustrates a sequence diagram of an application process.

Application Process; FIG. 10

The present embodiment is the same as the first embodiment except that a sequence from T510 to T516 in FIG. 10 is added.

In the present embodiment, when specifying the e-mail address AD1 of the administrator in T420 of FIG. 8, the SP server 10 creates an identity verification e-mail to confirm whether an operator operating the user terminal 300 is the user or not. The destination of the identity verification e-mail includes the e-mail address AD2 of the user received in T214 of FIG. 6. Further, the body of the identity verification e-mail includes an identity verification URL. The identity verification URL is an URL for accepting an instruction indicating that the operator operating the user terminal 300 is the user.

In T510, the SP server 10 executes a process to send the identity verification e-mail. As a result, the user terminal 300 receives the identity verification e-mail from the SP server 10 in T510 and displays the identity verification e-mail in T512.

In T514, the user selects the identity verification URL in the identity verification e-mail. As a result, the user terminal 300 sends the SP server 10 an identity verification notification indicating that the operator operating the user terminal 300 is the user in T516. Then, T422, T424 in FIGS. 8 and T444 in FIG. 9 are executed. If the identity verification URL in the identity verification e-mail is not selected, steps from T516 onward are not executed and the application process is terminated.

For example, it can be contemplated that a permission request is sent to the SP server 10 from a terminal device of a third party different from the user terminal 300. In this instance, the identity verification e-mail is sent not to the terminal device of the third party but to the user terminal 300 of the user. The user reads the identity verification e-mail and can realize that the third party illicitly applied for use of the remote function. Further, if the identity verification URL is not selected, the application process is not completed. Thus, illicit use of the remote function by the third party can be suppressed. T510 and T516 in FIG. 10 are an example of "confirmation process".

THIRD EMBODIMENT

The present embodiment is the same as the first embodiment except that a part of the registration process for the user and the application process is different due to T130 and T132 in FIG. 5 being executed.

Registration Process for Administrator; FIG. 5

In the registration process for the administrator, when receiving the association completion notification from the SP server 10 in T122, the administration terminal 400 sends the MFP 200 a storage request in T130 that requests the SP account name SA1 of the administrator be stored. The storage request includes the SP account name SA1 and the permission token TK1.

When receiving the storage request from the administration terminal 400 in T130, the MFP 200 authenticates the permission token TK1 included in the storage request and stores the SP account name SA1 included in the storage request in addition to the device identification information DI1 in T132.

Figure 11:
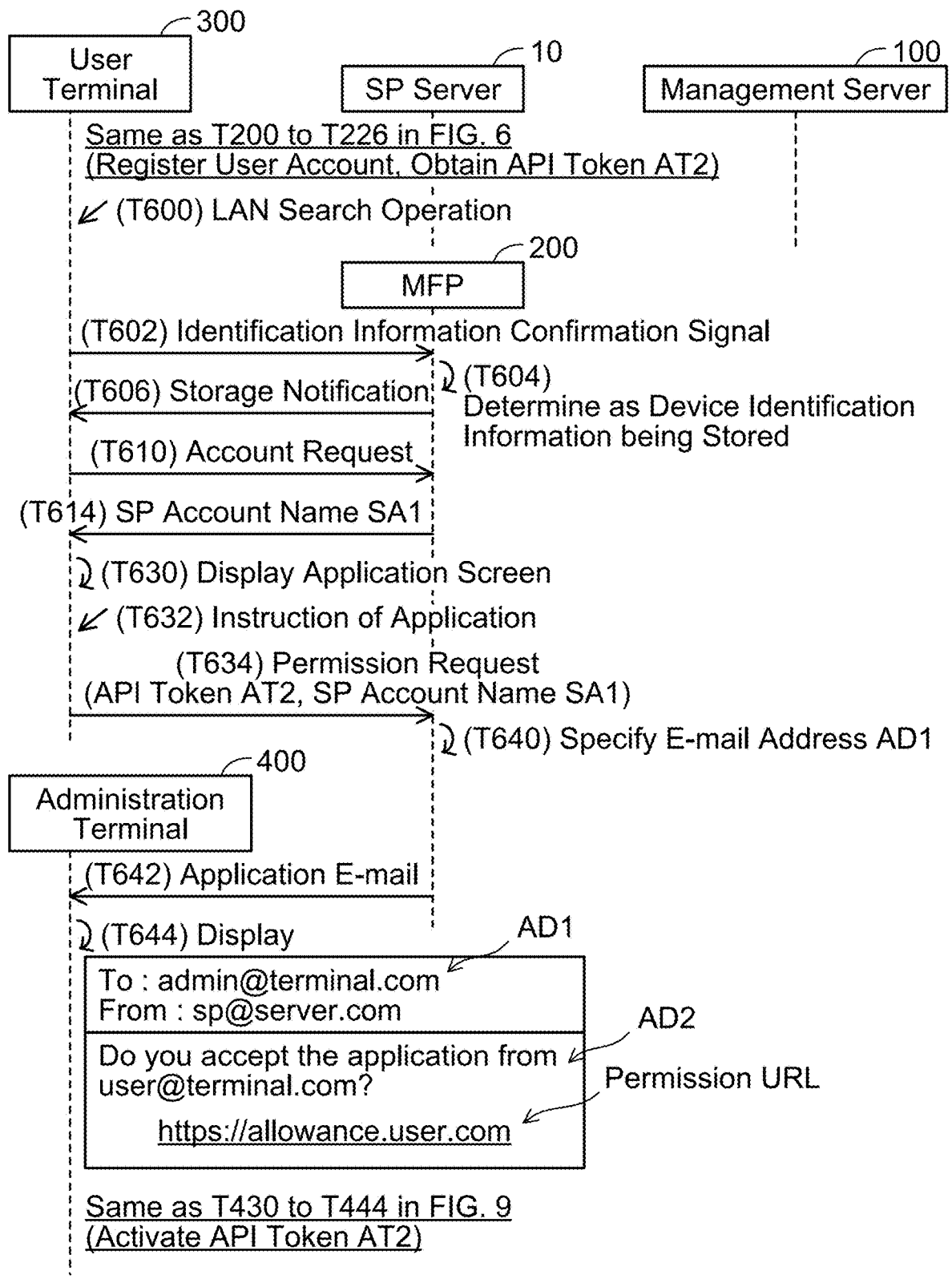
FIG. 11 illustrates a sequence diagram of a registration process for a user.

Registration Process for User and Application Process; FIG. 11

In the present embodiment, as with the first embodiment, the sequence from T200 to T226 in FIG. 6 is executed, so that the SP account information of the user is registered in the SP server 10 and the user terminal 300 obtains the API token AT2.

A sequence from T600 to T606 is the same as T240 and the sequence from T258 to T262 in FIG. 6. When receiving the storage notification from the MFP 200 in T606, the user terminal 300 sends an account request that requests an SP account name stored in the MFP 200 in T610. Thus, the user terminal 300 receives the SP account name SA1 stored in the MFP 200 from the MFP 200 in T614.

T630 and T632 are the same as T400 and T402 in FIG. 8. T634 is the same as T410 in FIG. 8 except that the permission request includes the SP account name SA1 received in T614 instead of the device token DT3.

When receiving the permission request from the user terminal 300 in T634, the SP server 10 specifies, in the service table 42, the e-mail address AD1 stored in association with the SP account name SA1 included in the permission request in T640. T642 and T644 are the same as T422 and T424 in FIG. 8. Also in the present case, the permission URL in the application e-mail is selected and the sequence from T430 to T444 in FIG. 9 is executed.

Also in the present embodiment, the application e-mail is sent to the administration terminal 400 (T642). Thus, also in the present embodiment, as with the first embodiment, the user can receive the permission from the administrator simply by operating the user terminal 300 without knowing who the administrator is. Further, unlike the first embodiment, the process of FIG. 7 is not executed in the present embodiment. The application process can thus be started promptly.

Correspondence Relationships

The SP account name SA1 of the administrator is an example of "specifying information". The association completion notification of T122 in FIG. 5 is an example of "second storage notification". T634, T640, and T642 in FIG. 11 are examples of "receive a permission request", "specify the communication information", and "send a receipt notification", respectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(Modification 1) The "communication device" is not limited to the MFP 200 but may be a printer, a scanner, a FAX machine, a PC, or the like.

(Modification 2) The communication system 2 may comprise a single server that includes both the function of the SP server 10 and the function of the management server 100, instead of the SP server 10 and the management server 100. In this modification, the single server is an example of "mediation server".

(Modification 3) The "receipt notification" is not limited to the application e-mail but may be text message such as SMS (short message service), SNS (social networking service) messaging, or the like.

(Modification 4) In the embodiments above, the MFP 200 sends a device token to the user terminal 300 (T304 in FIG. 7). Instead of this, the MFP 200 may display a device token. Then, the user may input the device token displayed by the MFP 200 to the user terminal 300. In this modification, the MFP 200 displaying a device token is an example of "outputs the specifying information".

(Modification 5) The user terminal 300 may receive a device token from the management sever 100 without the mediation of the MFP 200. In this modification, "predetermined request" can be omitted.

(Modification 6) The e-mail address AD2 of the user may not be included in the body of the application e-mail. In this modification, "user identification information" can be omitted.

(Modification 7) Instead of the e-mail address AD2 of the user, the name, account name, etc. of the user may be included in the body of the application e-mail. In this modification, the name, account name, etc. of the user are an example of "user identification information".

(Modification 8) In the second embodiment, for example, text message such as SMS, SNS messaging, or the like may be used instead of the identity verification e-mail. In this modification, a process using text message such as SMS, SNS messaging, or the like is an example of "confirmation process".

(Modification 9) In the second embodiment, a specific code may be included in the body of the identity verification e-mail. The user may input the specific code to a terminal device (e.g., the user terminal 300) and the terminal device may send the specific code to the SP server 10. In this modification, receiving the specific code from the terminal device operated by the user is an example of "confirmation process".

(Modification 10) In the embodiments above, the processes of FIGS. 3 to 11 are implemented by software (e.g., the programs 40, 140), however, at least one of these processes may be implemented by hardware such as a logic circuit, etc.

What is claimed is:

1. A mediation server mediating between a terminal device and a communication device, the mediation server comprising:
   a communication interface configured to communicate with the terminal device and the communication device;
   a memory configured to store communication information for mediating between an administration terminal and the communication device, wherein the administration terminal is a terminal device that an administrator of the communication device uses, and the communication information includes a first token, device identification information for identifying the communication device and administrator information assigned to the administrator; and
   a controller,
   wherein the controller is configured to:
      in a case where a predetermined request is received from the communication device after the communication information has been stored in the memory, send specifying information for specifying the communication information stored in the memory to the communication device via the communication interface, the communication device outputting the specifying information obtained from the mediation server, a user terminal obtaining the specifying information outputted by the communication device, the user terminal being a terminal device that a user different from the administrator uses;
      receive a permission request from the user terminal via the communication interface, the permission request is for requesting permission for the user terminal to communicate with the communication device via the mediation server, and the permission request includes the specifying information;
      in a case where the permission request is received from the user terminal, specify the communication information in the memory by using the specifying information included in the permission request;
      send a receipt notification to the administration terminal via the communication interface by using the communication information specified by using the specifying information, the receipt notification indicating that the permission request has been received from the user terminal;
      in a case where the administration terminal that has received the receipt notification from the mediation server accepts a predetermined operation, store a second token in the memory in association with the device identification information and the administrator information which is included in the communication information, the predetermined operation indicating that the administrator permits the user terminal to communicate with the communication device via the mediation server; and
      in a case where the second token is stored in the memory in association with the device identification information and the administrator information, send a first storage notification to the user terminal via the communication interface, the first storage notification indicating that the second token has been stored in the memory in association with the device identification information.

2. The mediation server according to claim 1, wherein the controller is further configured to:
   after the communication information has been stored in the memory, receive a storage request from the user terminal via the communication interface, the storage request being for requesting that user information assigned to the user be stored in the memory in association with the device identification information; and
   in a case where storage of the user information according to the storage request fails due to the communication information including the administrator information, send a notification to the user terminal via the communication interface, the notification being for prompting the user to perform an operation for causing the communication device to send the predetermined request.

3. The mediation server according to claim 1, wherein the controller is further configured to:
   in a case where the communication information is stored in the memory in a state where the communication information is not stored yet in the memory, send a second storage notification to the administration terminal, the second storage notification indicating that the communication information has been stored in the memory,
   the administration terminal sends the specifying information to the communication device in response to receiving the second storage notification from the mediation server,
   the communication device outputs the specifying information obtained from the administration terminal, and
   the user terminal obtains the specifying information outputted by the communication device.

4. The mediation server according to claim 3, wherein the communication device outputs the specifying information with the communication device accepting a specific operation as a trigger.

5. The mediation server according to claim 1, wherein the communication device outputs the specifying information with the communication device accepting a specific operation as a trigger.

6. The mediation server according to claim 1, wherein the controller is further configured to:
   in a case where the permission request is received from the user terminal, execute a confirmation process to confirm whether an operator operating the user terminal is the user or not.

7. The mediation server according to claim 6, wherein the confirmation process includes sending an e-mail addressed to an e-mail address available to the user.

8. The mediation server according to claim 1, wherein
the controller is further configured to receive user identification information for identifying the user from the user terminal via the communication interface, and
the receipt notification incudes the user identification information.

9. The mediation server according to claim 1, wherein
the controller is configured to send the receipt notification to the administration terminal by sending an e-mail addressed to an e-mail address available to the administrator.

10. The mediation server according to claim 1, wherein
the communication device has at least one of a print function and a scan function, and
mediating between the administration terminal and the communication device includes at least one of:
  sending, to the communication device, a setting value of the communication device received from the administration terminal;
  sending, to the communication device, a print request received from the administration terminal; and
  sending, to the administration terminal, a scan image received from the communication device.

11. A non-transitory computer-readable recording medium storing computer-readable instructions for a mediation server mediating between a terminal device and a communication device, wherein the mediation server comprising:
  a communication interface configured to communicate with the terminal device and the communication device;
  a memory configured to store communication information for mediating between an administration terminal and the communication device, wherein the administration terminal is a terminal device that an administrator of the communication device uses, and the communication information includes a first token, device identification information for identifying the communication device and administrator information assigned to the administrator; and
  a processor, wherein the computer-readable instructions, when executed by the processor cause the mediation server to:
  in a case where a predetermined request is received from the communication device after the communication information has been stored in the memory, send specifying information for specifying the communication information stored in the memory to the communication device via the communication interface, the communication device outputting the specifying information obtained from the mediation server, a user terminal obtaining the specifying information outputted by the communication device, the user terminal being a terminal device that a user different from the administrator uses;
  receive a permission request from the user terminal via the communication interface, the permission request is for requesting permission for the user terminal to communicate with the communication device via the mediation server, and the permission request includes the specifying information;
  in a case where the permission request is received from the user terminal, specify the communication information in the memory by using the specifying information included in the permission request;
  send a receipt notification to the administration terminal via the communication interface by using the communication information specified by using the specifying information, the receipt notification indicating that the permission request has been received from the user terminal;
  in a case where the administration terminal that has received the receipt notification from the mediation server accepts a predetermined operation, store a second token in the memory in association with the device identification information and the administrator information which is included in the communication information, the predetermined operation indicating that the administrator permits the user terminal to communicate with the communication device via the mediation server; and
  in a case where the second token is stored in the memory in association with the device identification information and the administrator information, send a first storage notification to the user terminal via the communication interface, the first storage notification indicating that the second token has been stored in the memory in association with the device identification information.

* * * * *